Figure 6:
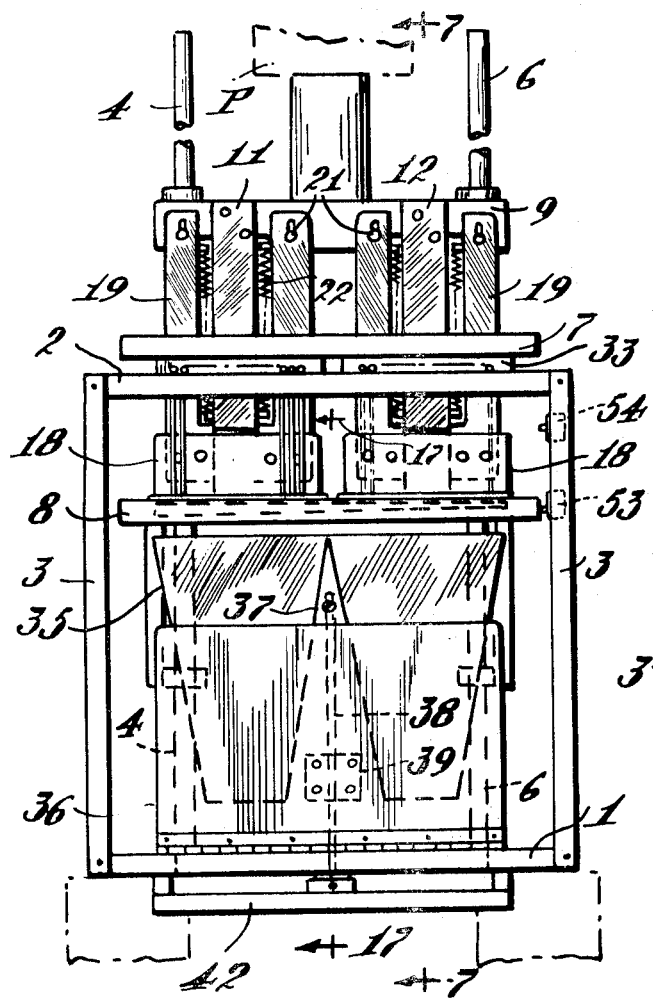

United States Patent

[11] 3,624,670

| [72] | Inventor | George F. Gordon |
| | | Nashua, N. H. |
| [21] | Appl. No. | 803,041 |
| [22] | Filed | Feb. 27, 1969 |
| [45] | Patented | Nov. 30, 1971 |
| [73] | Assignee | Dennison Manufacturing Company |
| | | Framingham, Mass. |

[54] APPARATUS FOR STRETCHING PLASTIC FILAMENTS
7 Claims, 18 Drawing Figs.

[52] U.S. Cl. ........................................ 18/1 FT,
264/291, 18/1 FS
[51] Int. Cl. ........................................ B29c 17/02
[50] Field of Search........................................ 18/1 F, 1
FT, 1 FS, 19 TM, 16 R; 264/291

[56]   References Cited
UNITED STATES PATENTS
3,380,122   4/1968   Kirk ........................... 18/1 FS Primary Examiner—J. Spencer Overholser
Assistant Examiner—Norman E. Lehrer
Attorney—Roberts, Cushman & Grover ABSTRACT: For stretching plastic filaments attached to a runner, each filament having an inner heat at its inner end adjacent the runner and an outer head at its outer end, apparatus comprising first and second pairs of abutments for engagement with said heads respectively, means for moving said pairs apart to stretch the filaments, means for severing and ejecting the runner after the heads have been engaged by the abutments, a hopper for catching the stretched filaments, and means for removing the hopper while the runner is being ejected.

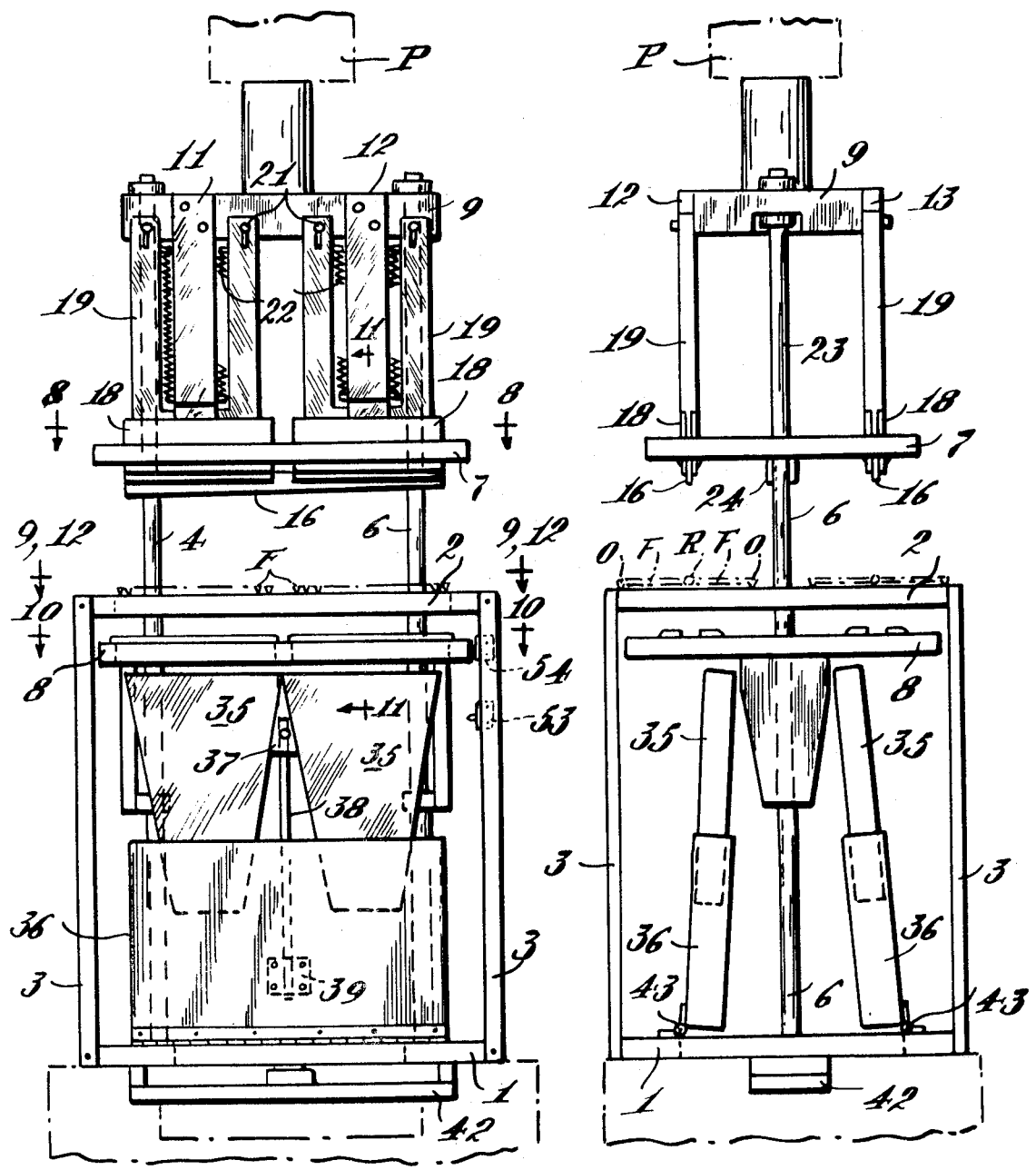

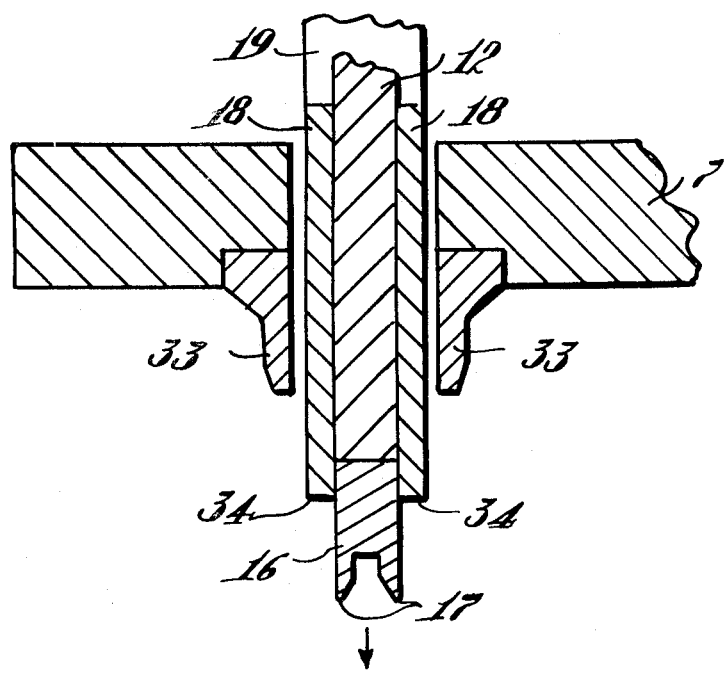
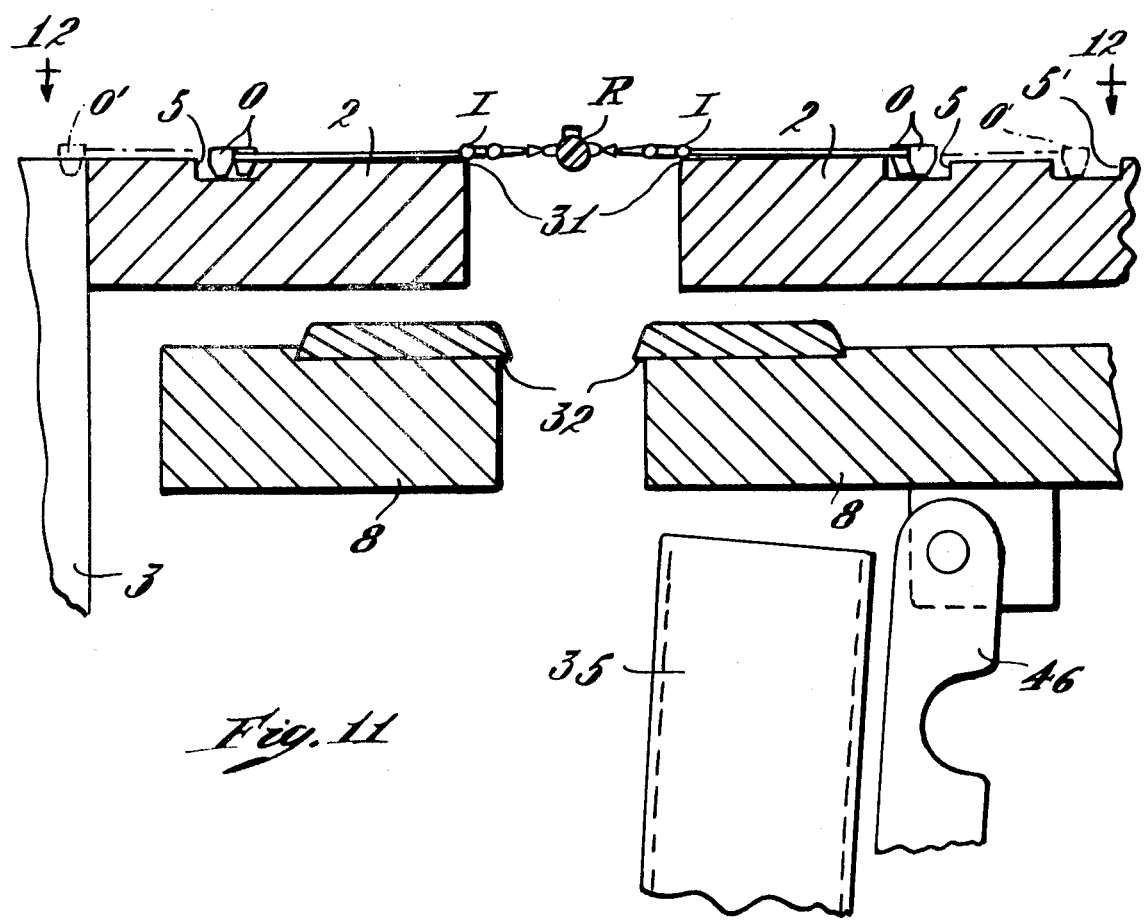
Fig. 11

APPARATUS FOR STRETCHING PLASTIC FILAMENTS

Objects of the present invention are to provide apparatus which stretches the filaments rapidly and uniformly and which is convenient and durable in use.

According to this invention the apparatus comprises first and second pairs of abutments engageable with said heads respectively, the abutments of each pair being disposed on opposite sides of the filament with a space therebetween less than the corresponding dimension of the head so that when moved apart the pairs of abutments engage behind the heads respectively, means for moving one pair of abutments away from the other pair along a path extending in a predetermined direction to stretch the filament, and means for feeding the filament in said direction into engagement with said abutments. Preferably said pairs comprise abutments disposed on one side of the filament at first and second locations along said path, the feeding means first engages the abutments at the first location behind one head and subsequently engages the abutments at the second location behind the other head, and the apparatus comprises means for conjointly actuating said moving means and feeding means including a bolster movable in said direction, the bolster carrying the abutments on the other side of the filament and carrying means for moving the second pair of abutments away from the first pair after engagement with said heads.

In a more specific aspect the filaments extend away from a runner in opposite directions, each filament having an inner head at its inner end adjacent the runner and an outer head at its outer end, the apparatus comprising an upper platen for supporting the runner and filaments, the platen having a first opening under the runner with first abutments on opposite sides thereof for engagement under said outer heads, a lower platen having a second opening under said first opening with second abutments on opposite sides thereof for engagement over said inner heads, a bolster movable downwardly, a plunger extending downwardly from the bolster in alignment with said openings for pushing the runner through the openings, third abutments slidable on said plunger for holding the outer heads over the first abutments, fourth abutments for holding the inner heads under said second abutments, the fourth abutments being slidable on the plunger between retracted position in which the inner heads may pass the second abutments and an advanced position in which the inner heads are held under the second abutments, and means for holding the fourth abutments in said retracted position until the inner heads have passed the second abutments, then advancing the fourth abutments relatively to the plunger into opposition to the second abutments and then causing the second and fourth abutments to advance together to stretch the filaments.

In the preferred embodiment a stem depends from said bolster and a floating platen is slidably mounted on the stem, the third abutments being disposed on the floating platen so that their downward movement is stopped by engagement with said outer heads, said stem has a shoulder to limit the downward movement of the floating platen, the apparatus has means for yieldingly supporting said second platen and means on said stem for pushing the second platen downwardly against the yielding means after the fourth abutments have moved in opposition to the second abutments, means for severing and ejecting the runner after the fourth abutments have reached the second abutments, a hopper below said openings to catch the stretched filaments, and means to move the hopper from beneath the openings while the runner is being ejected.

Figure 7:
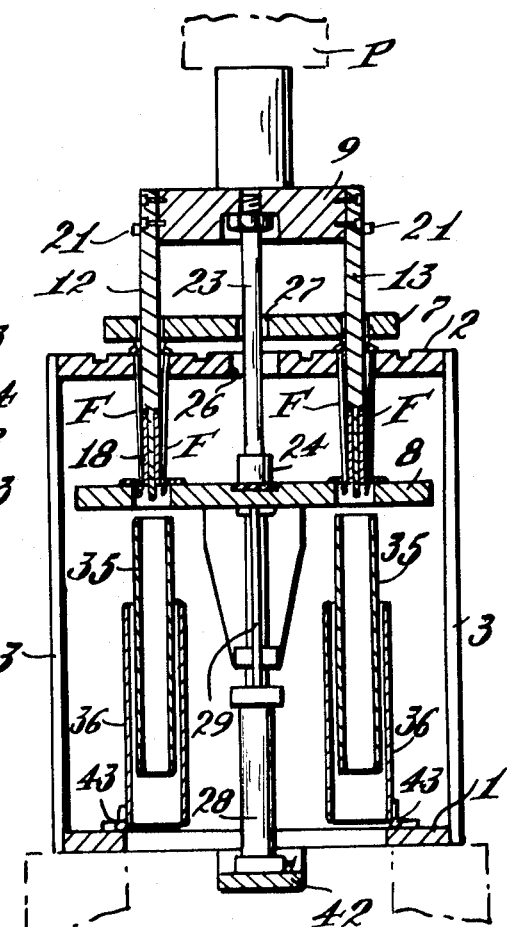
Figure 8:
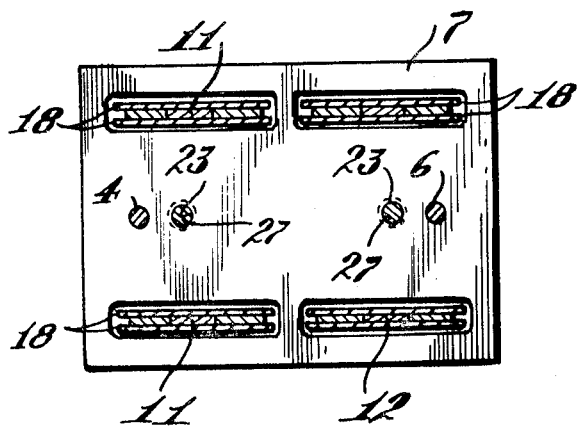
Figure 9:
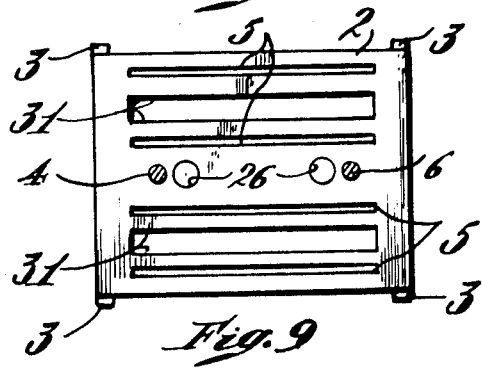
Figure 10:
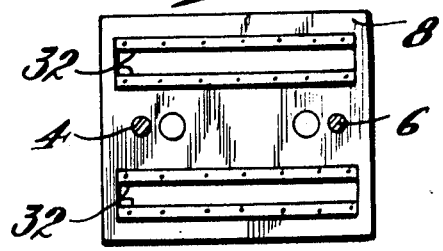
Figure 12:
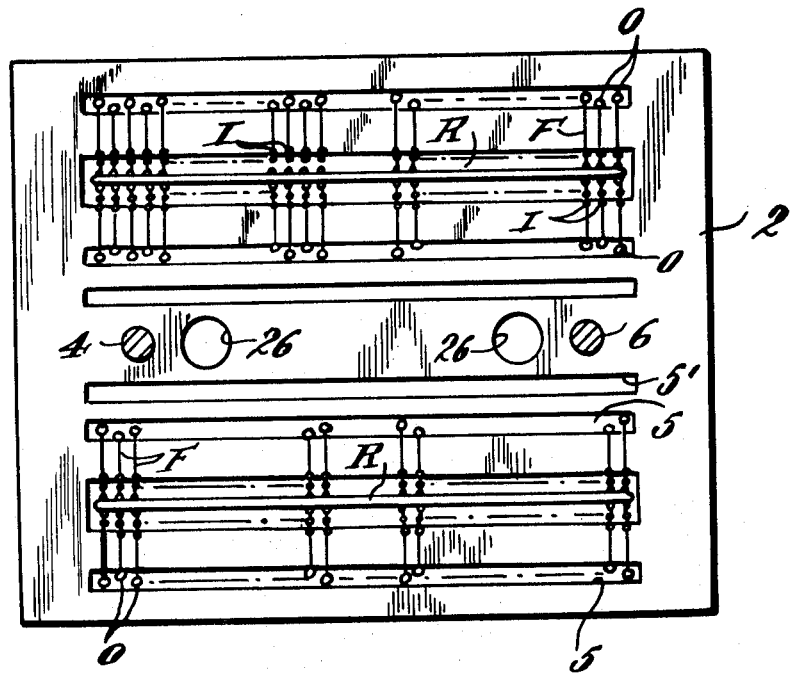
Figure 13:
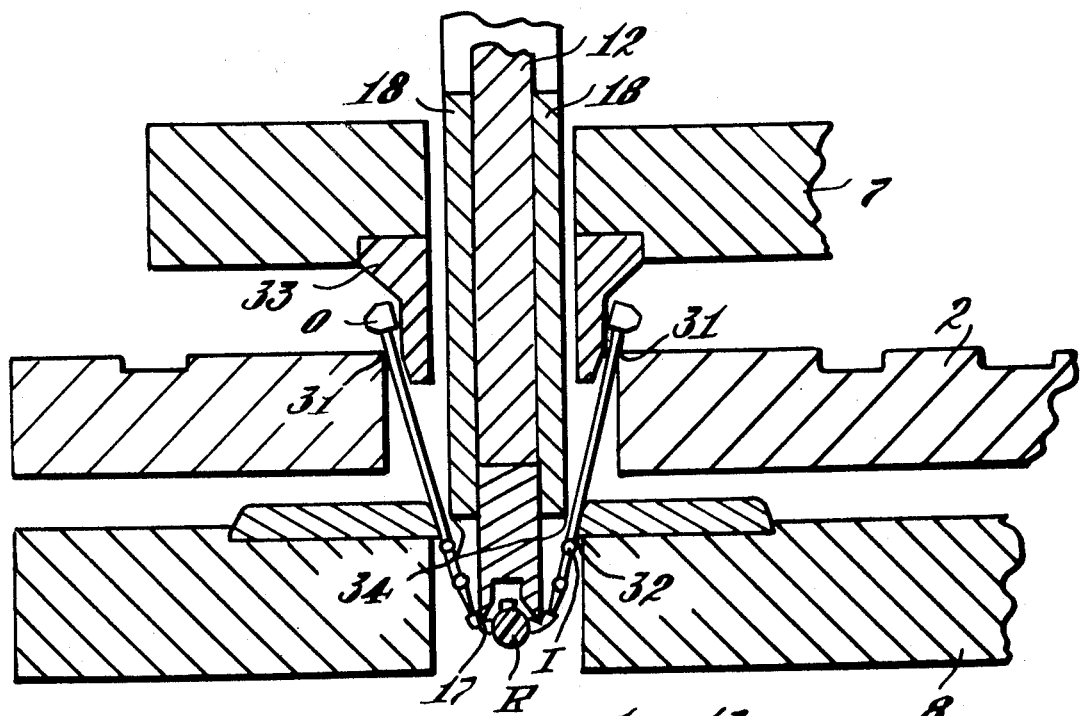
Figure 17:
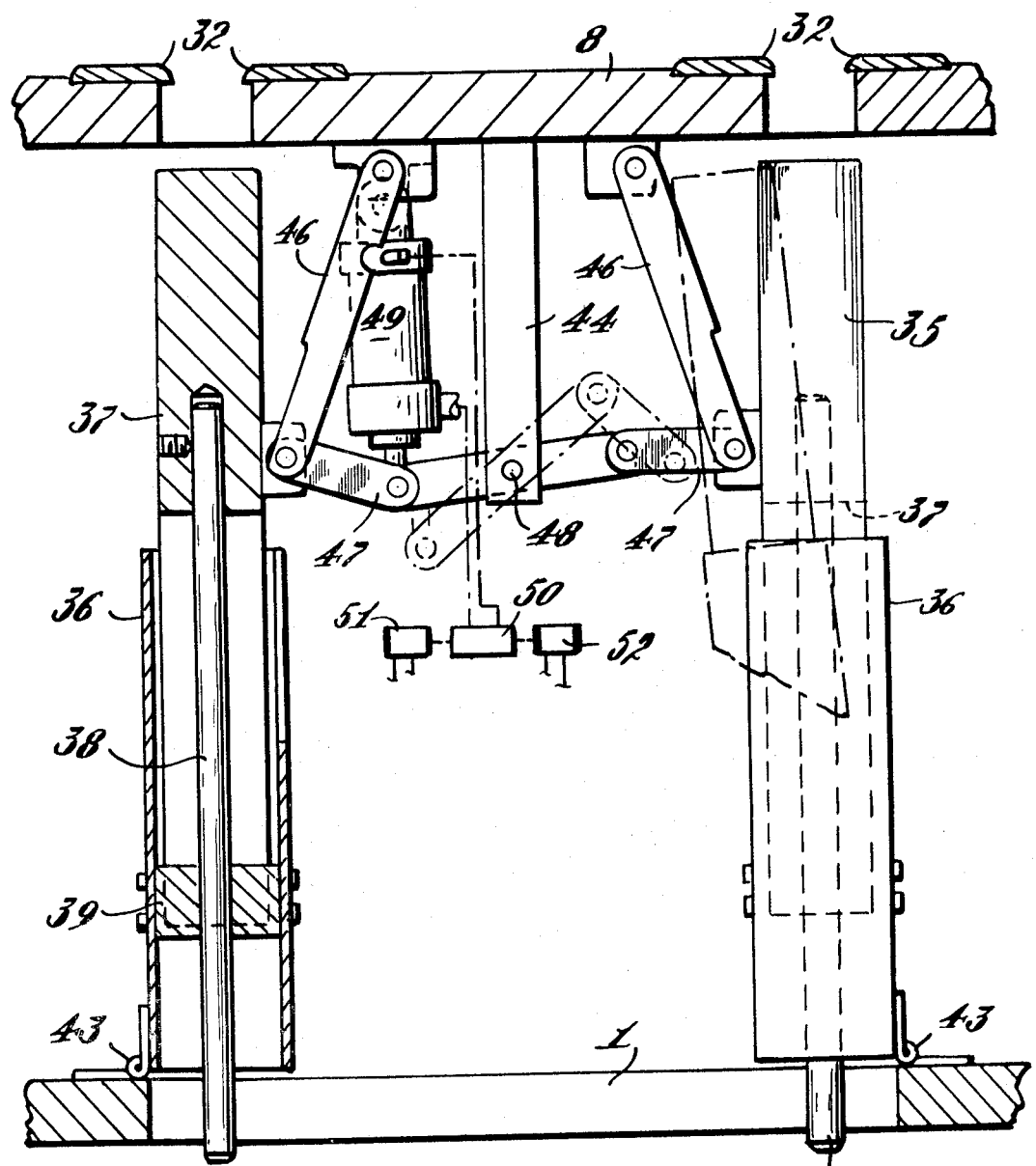
Figure 18:
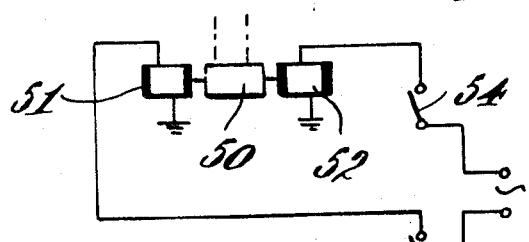

For the purpose of illustration a typical embodiment of the invention is shown in the accompanying drawings in which:

FIG. 1 is a plan view of an unstretched filament;
FIG. 2 is a side view of an unstretched filament;
FIG. 3 is a side view of a stretched filament;
FIG. 4 is a side view of the apparatus at the beginning of an operation;
FIG. 5 is a front view of the apparatus at the beginning of an operation;
FIG. 6 is a side view of the apparatus at the end of the stretching operation;
FIG. 7 is a section on line 7—7 of FIG. 6;
FIG. 8 is a section on line 8—8 of FIG. 4;
FIG. 9 is a section on line 9—9 of FIG. 4;
FIG. 10 is a section on line 10—10 of FIG. 4;
FIG. 11 is a section on line 11—11 of FIG. 4;
FIG. 12 is a section on line 12—12 of FIG. 4;
FIGS. 13–16 are views like FIG. 11 showing successive stages of operation;
FIG. 17 is a front view of the lower part of the apparatus, like FIG. 7 on a larger scale, with a portion in section on line 17—17 of FIG. 6; and
FIG. 18 is a circuit diagram.

The illustration is adapted to handle molded filaments comprising a runner R with four sets of filaments F extending from the sides thereof, each filament having an inner head I adjacent the runner and an outer head O at its outer end, alternate filaments differing in length as shown in FIGS. 11 and 12 so that the larger outer heads O are staggered to permit the filaments to be closer together. These filaments are constructed as shown in copending application Ser. No. 721,365, filed Apr. 15, 1968, U.S. Pat. No. 3,462,802, granted Aug. 26, 1969. The purpose of the apparatus is to stretch the filaments from the length shown in FIGS. 1 and 2 to the length shown in FIG. 3 thereby making them stronger even though smaller in cross section.

The particular embodiment of the invention chosen for the purpose of illustration comprises a frame having bottom and top plates 1 and 2 interconnected by corner posts 3. The plate 2 has recesses 5 and 5' in its upper side to accommodate the outer heads O and O' of filaments of different lengths. Mounted in the top and bottom plates are guide posts 4 and 6. Slidably mounted on these posts are upper and lower platens 7 and 8 and a bolster 9. Fast to the bolster are four plungers 11, 12, 13 and 14. The lower end of each plunger carries a hardened tip 16 having a recess to straddle the runner R and severing edges 17 on each side of the recess to sever the filaments from the runner. Opposite sides of each plunger are recessed at the lower end to receive plates 18 which are fast to the opposite sides of bars 19. These bars have slots in their upper ends sliding on screws 21 on the bolster 9. Springs 22 normally hold the bars 19 in their lower position with the screws in the upper ends of the slots (FIG. 4). The bolster also carries two depending stems 23 having heads 24 on their lower ends (FIGS. 5 and 7). The stems extend through openings 26 in the plate 2 which are larger than the heads 24 and through openings 27 in the upper platen 7 which are smaller than the heads (FIG. 7) so that in the idle position the platen 7 rests on the heads 24 (FIG. 5).

The lower platen 8 is yieldingly urged upwardly to the idle position shown in FIGS. 4 and 5 by an air cylinder 28 and piston rod 29 and is forced downwardly to its lower position shown in FIGS. 6 and 7 by heads 24 on stems 23.

As shown more clearly in the enlarged views FIGS. 11 and 13 to 16 the plate 2 has slots the opposite edges of which constitute first abutments 31 for engagement under the outer heads O (FIG. 9), the lower platen 8 has slots the opposite edges of which constitute second abutments 32 for engagement over the inner heads I (FIG. 10), the upper platen 7 has third abutments 33 for holding the outer heads O over the first abutments and the lower ends of plates 18 constitute fourth abutments 34 for holding the inner heads I under the second abutments.

Figure 14:
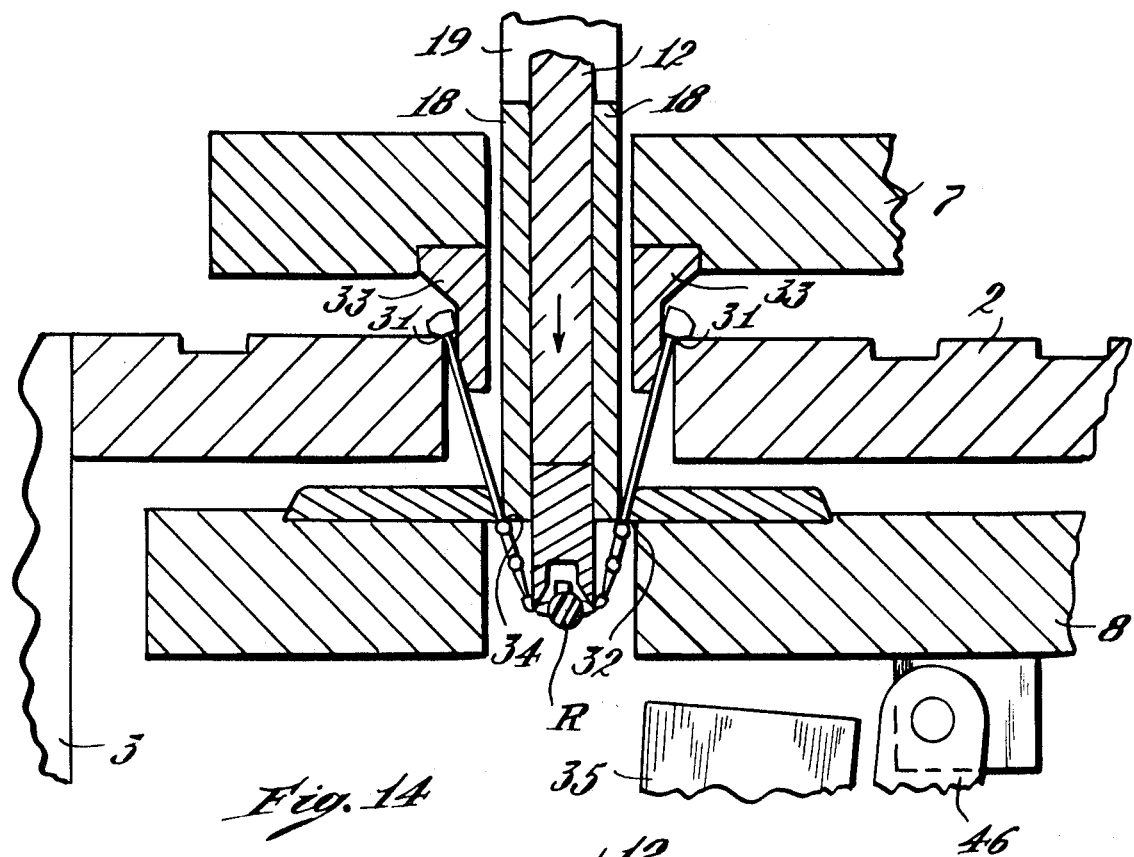
Figure 15:
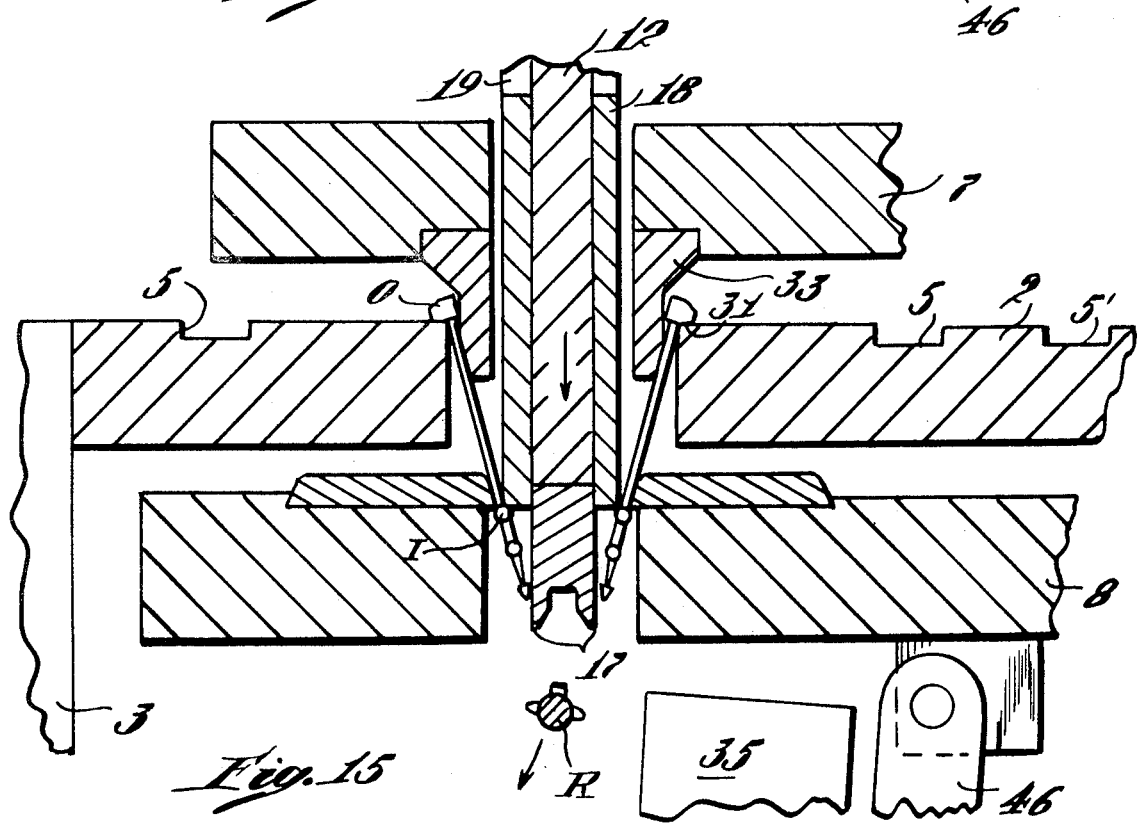
Figure 16:
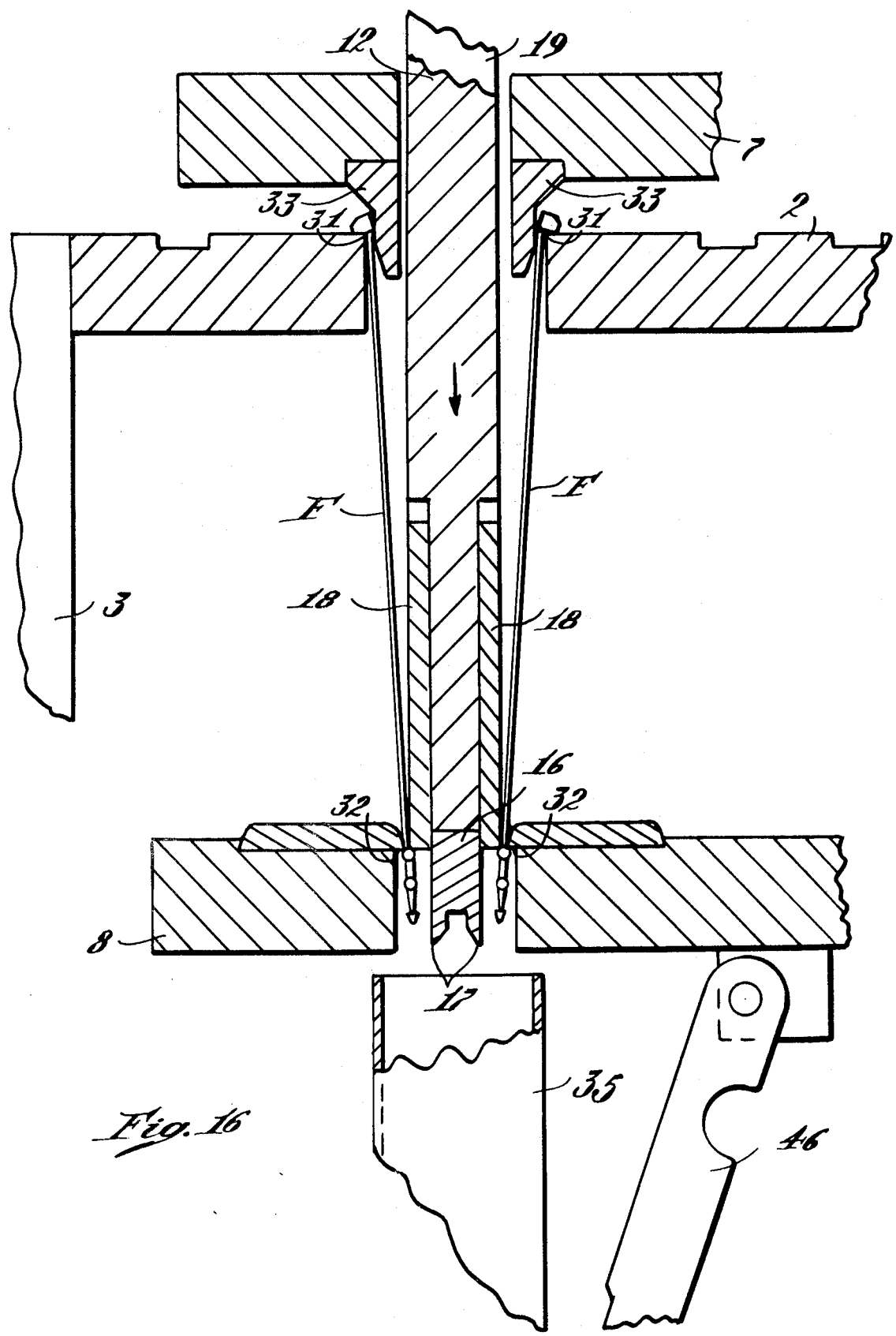

The bolster 9 is moved up and down by any suitable means as indicated diagrammatically at P in FIGS. 1, 2, 6 and 7. Before starting a cycle of operations a runner R and attached filaments are placed on the stationary plate 2 in the position shown in FIGS. 4, 5, 11 and 12. As the bolster 9 descends the upper plate 7, resting on heads 24, descends with it, and the plungers 12 push the runner R through the slots in plate 2 and platen 8. When the parts reach the position shown in FIG. 13 the weight of the floating platen 7 presses the outer heads O against the abutments 31 and rests on the heads. In this position the inner heads I have passed the abutments 32. Continued descent of the plungers brings the abutments 34 against the heads I (FIG. 14). This arrests the descent of the plates 18 and bars 19 so that the screws 21 move from the top of the slots in the bars (FIG. 4) to the bottom of the slots (FIG. 6). During this period the continued descent of the plungers 12 severs the filaments from the runner and ejects the runner (FIG. 15). At this point the heads 24 on stems 23 engage the lower platen 8 so that the platen then descends with the plungers 12 against the pressure in cylinder 28 (FIG. 7), stretching the filaments to the length shown in FIGS. 3 and 16. When the bolster 9 rises the heads 24 on stems 23 lift the upper platen 7, thereby releasing the filaments and permitting them to drop.

Mounted on the bottom of the lower platen 8 are chutes 35 to guide the filaments out of the machine. These chutes extend into other chutes 36 which are hinged to the base 1 at 43 and which lead to receivers (not shown). The chutes move from the inner position shown in FIGS. 5, 11 and 15 where the runner falls free to the outer position shown in FIGS. 7, 16 and 17 where the filaments fall into the chutes. The two chutes 35 on each side of the machine are connected by V-shaped blocks 37. These blocks are secured to rods 38 by setscrews (FIG. 17). The rods slide in journals 39 mounted in the chutes 36 hinged to the base 1 at 43. Depending from the bottom of the lower platen is a stem 44 and linkage 46, 47 and 48. An air cylinder 49 moves the parts back and forth between the operative position shown in full lines and the inoperative position shown in broken lines (FIG. 17). The cylinder is controlled by a valve 50 actuated by solenoids 51 and 52 which are controlled by switches 53 and 54 at opposite ends of the path of the lower platen 8 (FIGS. 4 and 6). When the platen reaches its lowest position it closes switch 53 to move the chutes into position to receive the filaments when they are dropped as above described and when the platen reaches its upper position the switch 54 is closed to return the chutes to inoperative position.

I claim:

1. Apparatus for stretching a filament having a head on each end comprising first and second pairs of abutments engageable with said heads respectively, the abutments of each pair being disposed on opposite sides of the filament with a space therebetween less than the corresponding dimension of the head so that the pairs of abutments engage behind the heads respectively, means for moving the individual abutments of each pair away from each other a distance at least equal to the corresponding dimension of the heads so that the heads may be fed between the abutments, means for moving one pair of abutments away from the other pair along a path to stretch the filament, and means for feeding the filament in the direction of said path into engagement with said abutments, said pairs comprise abutments disposed on one side of the filament at first and second locations along said path, and means for conjointly actuating said moving means and feeding means including a bolster movable in the direction of said path, the bolster carrying the abutments on the other side of the filament and carrying means for moving the second pair of abutments away from the first pair after engagement with said heads.

2. Apparatus for stretching filaments extending away from a runner in opposite directions, each filament having an inner head at its inner end adjacent the runner and an outer head at its outer end, apparatus comprising a plate for supporting the runner and filaments, said plate having a first opening under the runner with first abutments on opposite sides thereof for engagement under said outer heads, a lower platen having a second opening under said first opening with second abutments on opposite sides thereof for engagement over said inner heads, a bolster being movable downwardly and having an upper platen, a plunger extending downwardly from the bolster in alignment with said openings for pushing the runner through the openings, third abutments on said upper platen for holding the outer heads over the first abutments, fourth abutments for holding the inner heads under said second abutments, the fourth abutments being slidable on the plunger between a retracted position in which the inner heads may pass the second abutments and an advanced position in which the inner heads are held under the second abutments, and means for holding the fourth abutments in said retracted position until the inner heads have passed the second abutments and for then advancing the fourth abutments relatively to the plunger into opposition to the second abutments and for then causing the second and fourth abutments to advance together to stretch the filaments.

3. Apparatus according to claim 2 further characterized by a depending stem on said bolster and wherein said upper platen is slidably mounted on said stem, the third abutments being disposed on said upper platen so that their downward movement is stopped by engagement with said outer heads.

4. Apparatus according to claim 3 wherein said stem has a shoulder to limit the downward movement of the upper platen.

5. Apparatus according to claim 3 further characterized by means for yieldingly supporting said lower platen and means on said stem for pushing the lower platen downwardly against the yielding means after the fourth abutments have moved into opposition to the second abutments.

6. Apparatus according to claim 2 further characterized by means for severing and ejecting the runner after the fourth abutments have reached the second abutments.

7. Apparatus according to claim 6 further characterized by a hopper below said openings to catch the stretched filaments, and means to move the hopper from beneath the openings while the runner is being ejected.

* * * * *